(12) United States Patent
Wang et al.

(10) Patent No.: US 7,990,492 B2
(45) Date of Patent: Aug. 2, 2011

(54) LIQUID CRYSTAL DISPLAY AND DISPLAY DEVICE WITH LIGHT SOURCE ASSEMBLY

(75) Inventors: Te-Hsu Wang, Miao-Li (TW); Ming-Chuan Li, Miao-Li (TW); Zhao-Yu Wang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 252 days.

(21) Appl. No.: 12/231,498

(22) Filed: Sep. 2, 2008

(65) Prior Publication Data

US 2009/0059129 A1     Mar. 5, 2009

(30) Foreign Application Priority Data

Aug. 31, 2007   (CN) ...................... 2007 2 0122572 U

(51) Int. Cl.
*G02F 1/1335*     (2006.01)
(52) U.S. Cl. ............................... 349/65; 349/64; 349/61
(58) Field of Classification Search ............... 349/61, 349/64, 65
See application file for complete search history.

(56) References Cited

U.S. PATENT DOCUMENTS

| | | | |
|---|---|---|---|
| 6,805,468 B2 * | 10/2004 | Itoh et al. ...................... | 362/362 |
| 7,133,093 B2 | 11/2006 | Ochiai et al. | |
| 7,339,491 B2 * | 3/2008 | Wu et al. .................... | 340/815.4 |
| 7,436,000 B2 * | 10/2008 | Kim et al. ....................... | 257/98 |
| 7,481,566 B2 * | 1/2009 | Han ............................. | 362/621 |
| 7,490,973 B2 * | 2/2009 | Fujikawa et al. ............. | 362/634 |
| 7,570,321 B2 * | 8/2009 | Takahashi et al. .............. | 349/65 |
| 7,582,906 B2 * | 9/2009 | Kurihara ........................ | 257/79 |
| 7,637,646 B2 * | 12/2009 | Byun et al. .................... | 362/608 |
| 7,646,450 B2 * | 1/2010 | Jung .............................. | 349/69 |
| 7,667,787 B2 * | 2/2010 | Mahama et al. ................ | 349/64 |
| 2003/0076669 A1 * | 4/2003 | Itoh et al. ........................ | 362/31 |
| 2003/0184990 A1 * | 10/2003 | Lin ................................. | 362/31 |
| 2004/0239831 A1 * | 12/2004 | Palumbo et al. ................ | 349/64 |
| 2006/0012731 A1 * | 1/2006 | Ishiwa et al. ................... | 349/65 |
| 2006/0022935 A1 * | 2/2006 | Sakai et al. .................... | 345/102 |
| 2007/0008457 A1 * | 1/2007 | Takahashi et al. .............. | 349/64 |
| 2007/0153548 A1 * | 7/2007 | Hamada et al. ................ | 362/615 |
| 2007/0171346 A1 * | 7/2007 | Chang et al. ................... | 349/150 |
| 2007/0210326 A1 * | 9/2007 | Kurihara ......................... | 257/98 |
| 2007/0223248 A1 * | 9/2007 | Han ............................... | 362/612 |
| 2007/0274099 A1 * | 11/2007 | Tai et al. ........................ | 362/610 |
| 2008/0049448 A1 * | 2/2008 | Hamada et al. ................ | 362/612 |
| 2008/0074580 A1 * | 3/2008 | Chang ............................ | 349/65 |
| 2009/0237593 A1 * | 9/2009 | Hoshi ............................. | 349/62 |

* cited by examiner

*Primary Examiner* — K. Cyrus Kianni
(74) *Attorney, Agent, or Firm* — Wei Te Chung

(57) ABSTRACT

An exemplary light source assembly includes a light guide plate, a printed circuit board facing the light guide plate, and at least two light emitting elements. The at least two light emitting elements are angled on the printed circuit board. Light emitted from the at least two light emitting elements is obliquely transmitted onto the light guide plate.

20 Claims, 4 Drawing Sheets

US 7,990,492 B2

LIQUID CRYSTAL DISPLAY AND DISPLAY DEVICE WITH LIGHT SOURCE ASSEMBLY

CROSS-REFERENCE TO RELATED APPLICATION

This application is related to, and claims the benefit of, a foreign priority application filed in China as Serial No. 200720122572.2 on Aug. 31, 2007. The related application is incorporated herein by reference.

FIELD OF THE INVENTION

The present invention relates to light source assemblies and liquid crystal displays using the same.

GENERAL BACKGROUND

Liquid crystal displays are commonly used as display devices for compact electronic apparatuses, because they not only provide good quality images but are also very thin and light. Referring to FIG. 5, a typical liquid crystal display 10 includes a first frame 11, a liquid crystal panel 12, a backlight module 13, light emitting diodes (LEDs) 15, a light holder 17, a printed circuit board 18, and a second frame 19. The first frame 11 defines an opening (not labeled). The first frame 11 and the second frame 19 cooperatively define an accommodating space to receive the liquid crystal panel 12, the backlight module 13, the LEDs 15, the light holder 17, and the printed circuit board 18. The liquid crystal panel 12 corresponds to the opening.

The LEDs 15 are located on the light holder 17. The light holder 17 bearing the LEDs 15 is adjacent to a side surface of the liquid crystal panel 12. The LEDs 15 face an inner surface of the first frame 11. The printed circuit board 18 is fixed between the light holder 17 and the second frame 19. The LEDs 15 are electrically connected to the printed circuit board 18 by wires. Light emitting from the LEDs 15 reach the inner surface of the first frame 11 and generate a halo effect on the edge of the first frame 11.

However, the liquid crystal display 10 includes the light holder 17 to provide location of the LEDs 15, complicating assembly of the liquid crystal display 10. Furthermore, because the LEDs 15 emit light within certain angles, a large number of LEDs 15 is needed to illuminate the edge of the first frame 11.

What is needed, therefore, is a light source assembly that can overcome the described limitations, as well as a liquid crystal display utilizing the light source assembly.

SUMMARY

In one exemplary embodiment, a light source assembly includes a light guide plate, a printed circuit board facing the light guide plate, and at least two light emitting elements. The at least two light emitting elements are angled on the printed circuit board. Light from the at least two light emitting elements is transmitted to the light guide plate obliquely.

Other novel features and advantages will become more apparent from the following detailed description when taken in conjunction with the accompanying drawings, in which:

DETAILED DESCRIPTION OF PREFERRED EMBODIMENTS

Reference will now be made to the drawings to describe the preferred embodiments in detail.

Figure 1:
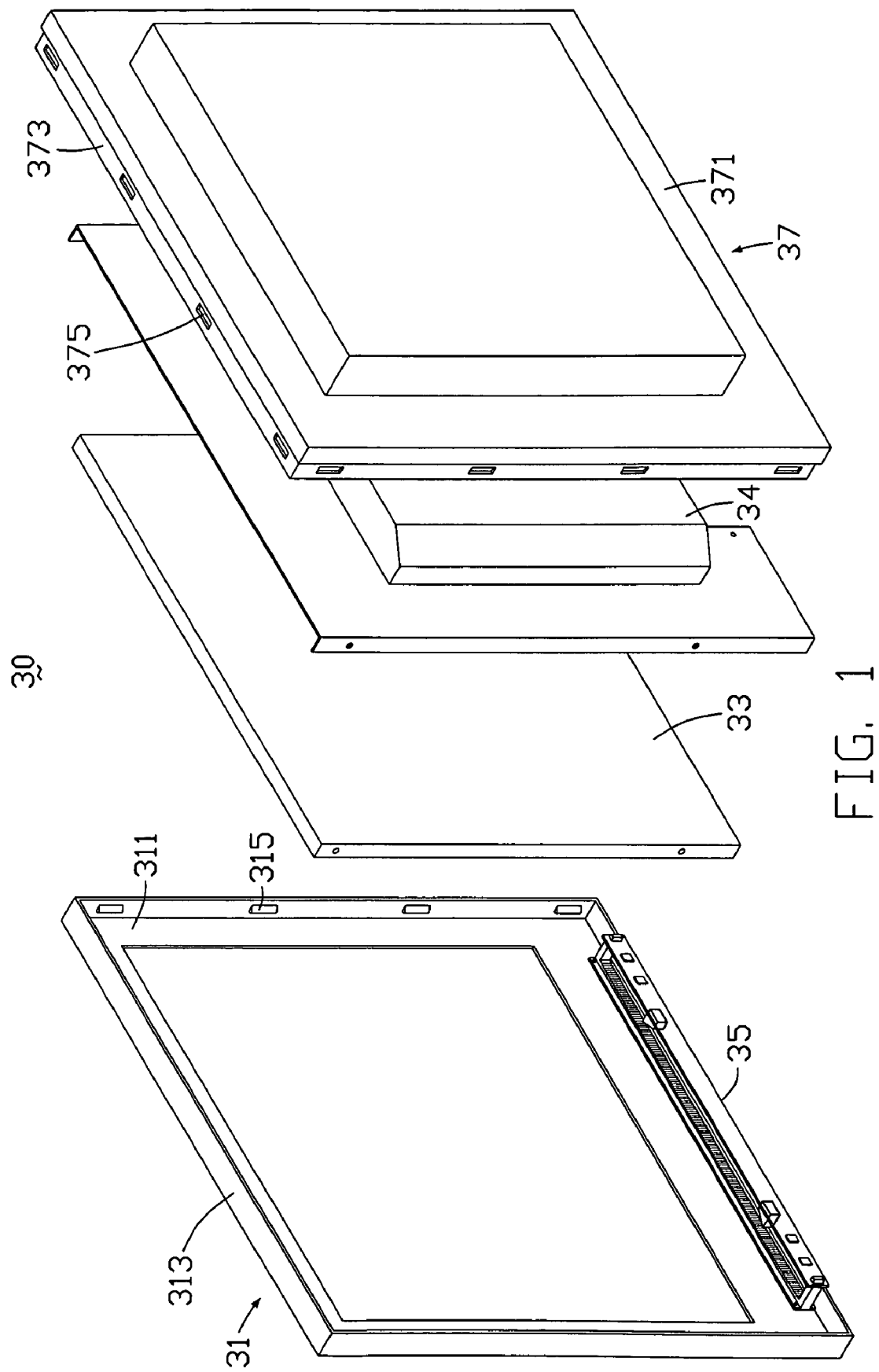
FIG. 1 is an exploded, isometric view of a liquid crystal display according to a preferred embodiment of the present invention, the liquid crystal display including a light source assembly.

Referring to FIG. 1, a liquid crystal display 30 according to a preferred embodiment of the present invention is shown. The liquid crystal display 30 includes a first frame 31, a liquid crystal panel 33, a backlight module 34, a light source assembly 35, and a second frame 37. The first frame 31 cooperates with the second frame 37 to form a space to receive the liquid crystal panel 33, the backlight module 34, and the light source assembly 35.

The first frame 31 is plastic and includes a front wall 311, and four first side walls 313 connected end to end. The front wall 311 is perpendicularly connected with the first side walls 313. The front wall 311 defines an opening (not labeled) corresponding to the liquid crystal panel 33. Inner surfaces of the first side walls 313 include a plurality of hooks 315 extending inwardly.

The second frame 37 is plastic and includes a back wall 371, and four second side walls 373 connected end by end. The back wall 371 is perpendicularly connected with the second side walls 373. The second side walls 373 define a plurality of grooves 375 corresponding to the hooks 315.

The liquid crystal panel 33 is adjacent to the front wall 311 of the first frame 31. A display region of the liquid crystal panel 33 corresponds to the opening of the first frame 31. The backlight module 34 is adjacent to the back wall 371 of the second frame 37. A side surface of the liquid crystal panel 33, an inner surface of the front wall 311, and an inner surface of the second side wall 373 form a space to accommodate the light source assembly 35. The light source assembly 35 generates light to illuminate an edge of the front wall 311 of the first frame 31, generating an optical halo effect.

Figure 2:
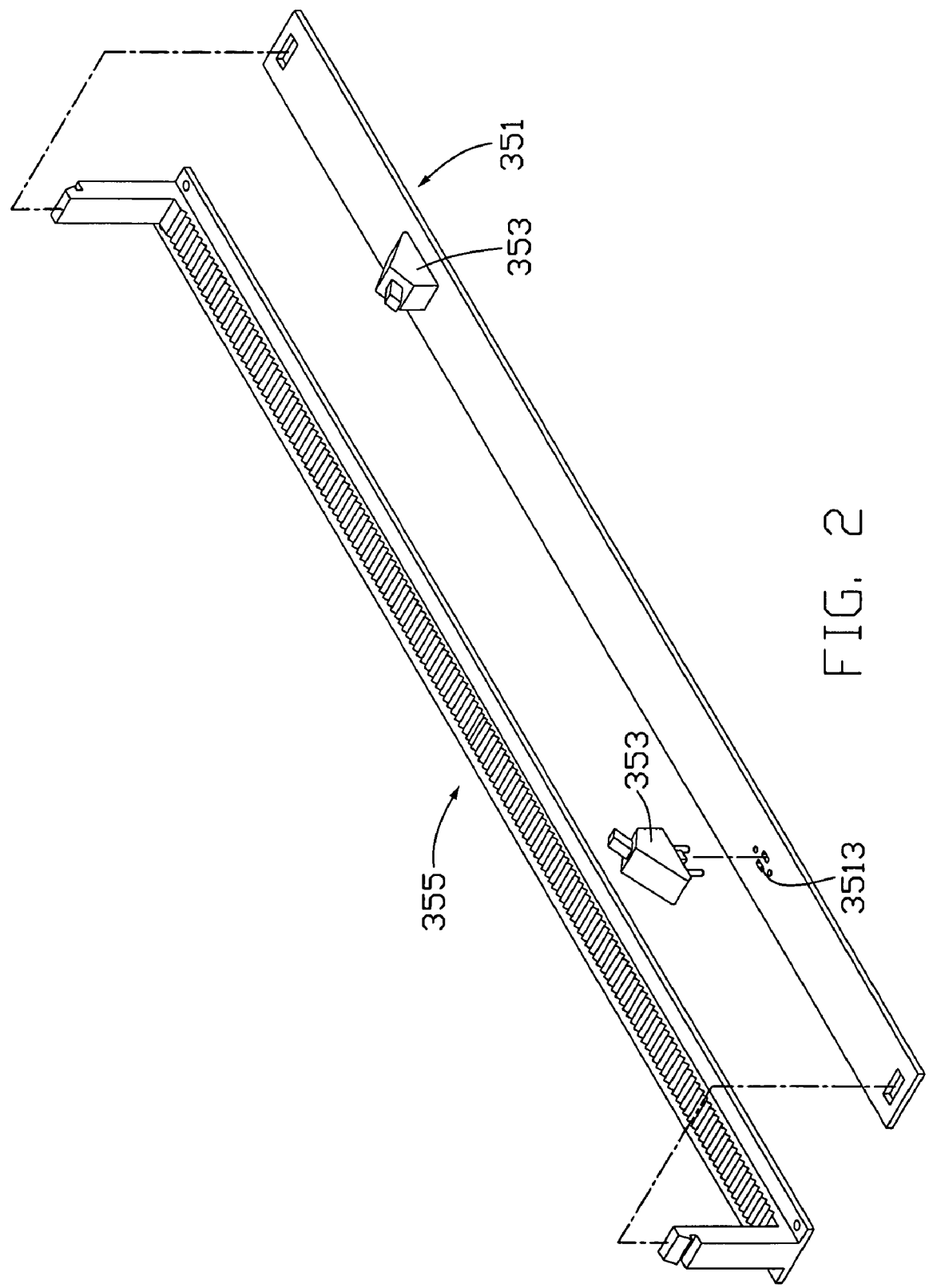
FIG. 2 is an exploded, isometric view of the light source assembly of FIG. 1, the light source assembly including two light emitting elements and a light guide plate.

Referring also to FIG. 2, the light source assembly 35 includes a printed circuit board 351, two light emitting elements 353, and a light guide plate 355. The printed circuit board 351 is adjacent to a second side wall 373 of the second frame 37. An outer surface of the printed circuit board 351 facing the first frame 31 is coated with reflective materials, and an inner surface of the printed circuit board 351 facing the second frame 37 includes a plurality of circuits. The printed circuit board 351 defines a plurality of slots 3513. The light emitting elements 353 are placed on the outer surface of the printed circuit board 351 and are fixed into the slot 3513.

Figure 3:
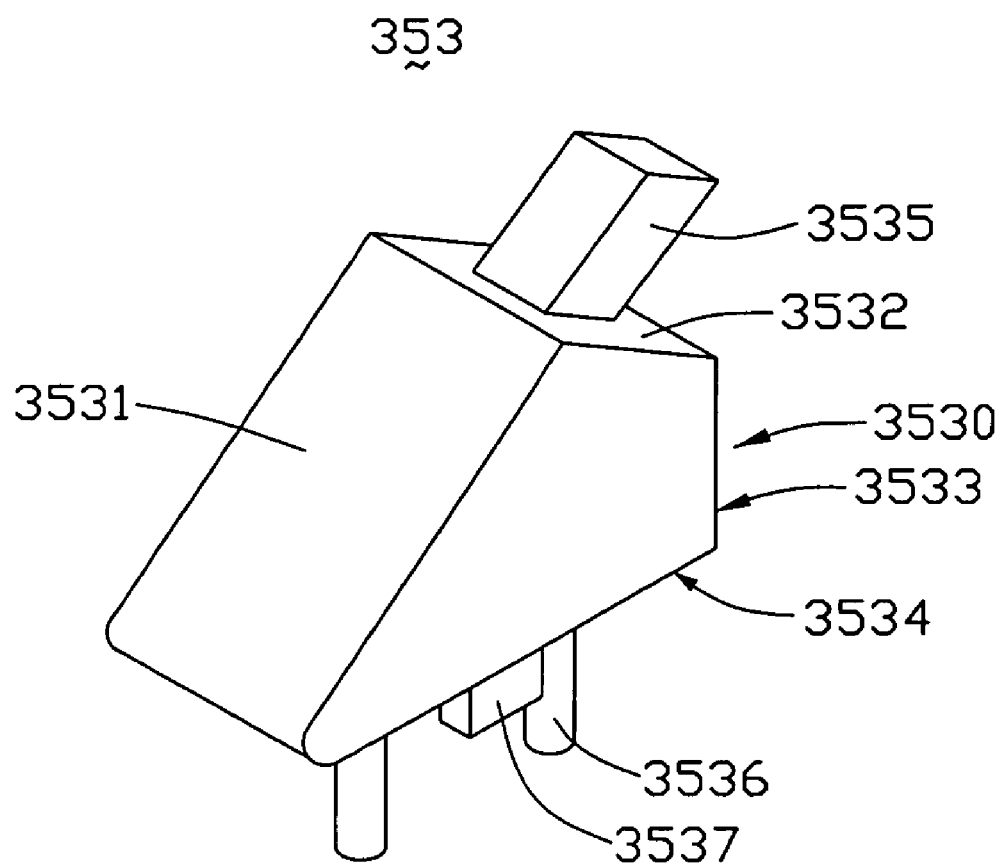
FIG. 3 is an enlarged view of the light emitting element of FIG. 2.

Referring also to FIG. 3, the light emitting element 353 includes a base 3530, and an LED 3535 located on the base 3530. The base 3530 is cuniform, and is plastic. The base 3530 includes a first surface 3531, a second surface 3532, a third surface 3533, and a bottom surface 3534 connected end to end. The first surface 3531 and the bottom surface 3534 define an acute angle. The acute angle can be 35°. The first surface 3531 is perpendicularly connected to the second surface 3532. The third surface 3533 is perpendicularly connected with the bottom surface 3534. The LED 3535 is disposed on the second surface 3532 of the base 3530. Light emission from LED 3535 is maintained at an acute angle 35° relative to the printed circuit board 351.

The bottom surface 3534 includes two poles 3536 and two electrodes 3537 plugged into the slot of the printed circuit board 351. The poles 3536 are configured to fix the base to the printed circuit board 351. The electrodes 3537 are configured to electrically connect the LED 3535 with the circuits on the printed circuit board 351. The bottom surface 3534 of the base 3530 remains close to the outer surface of the printed circuit board 351.

Figure 4:
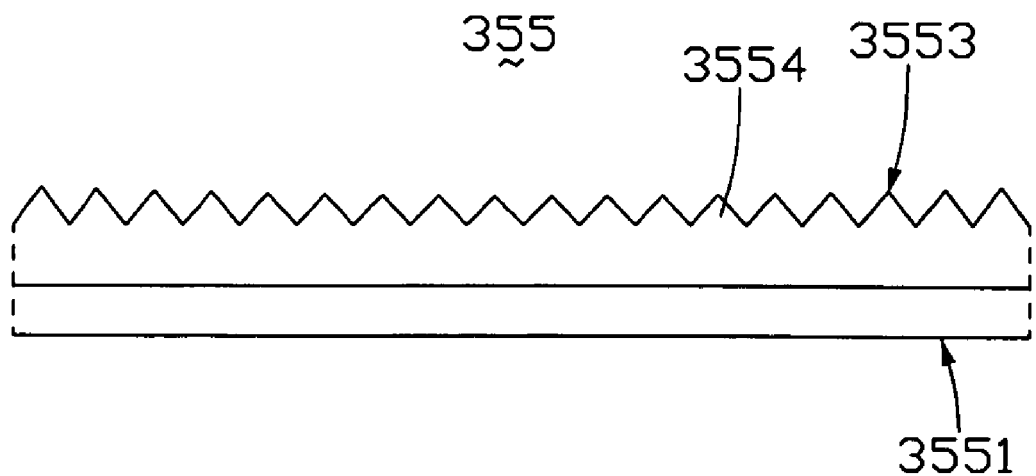
FIG. 4 is an enlarged view of the light guide plate of FIG. 2.
Figure 5:
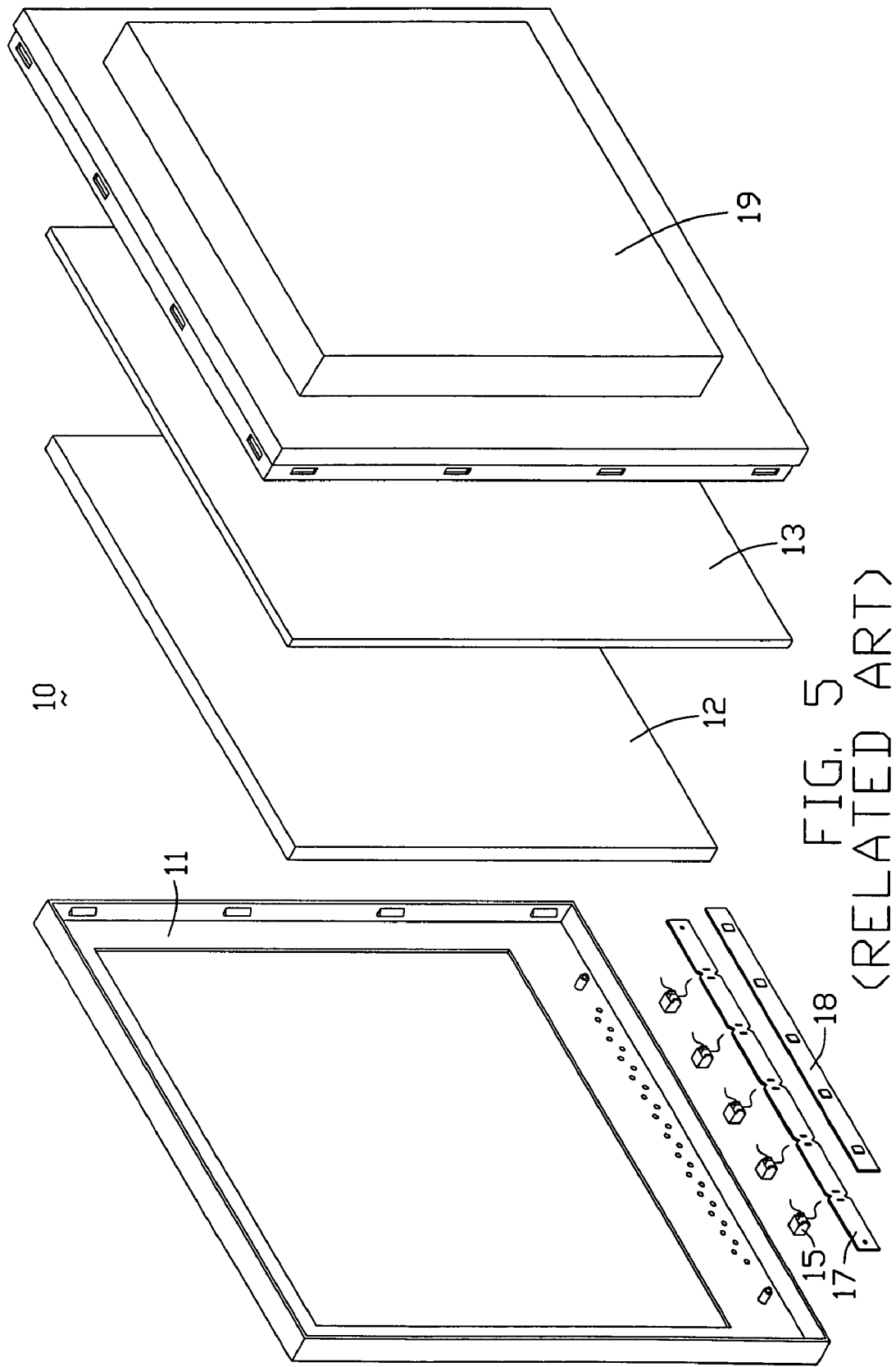
FIG. 5 is an exploded, isometric view of a conventional liquid crystal display.

Referring also to FIG. 4, the light guide plate 355 is acrylic. The light guide plate 355 includes a light emitting surface 3551 and a light incident surface 3553. The light incident surface 3553 includes a plurality of V-shaped protrusions 3554. A transverse section of the V-shaped protrusion 3554 is an equilateral triangle. Light is transmitted into the light guide plate 355 through the light incident surface 3553. The light exiting the light emitting surface 3551 maintains uniformity by control of the V-shaped protrusions 3554. When the liquid crystal display 30 is assembled, the light emitting surface 3551 is close to the front wall 311 of the first frame 31, and the light incident surface 3553 faces the printed circuit board 351. The light emitting element 353 is thus located between the light guide plate 355 and the printed circuit board 351.

In operation, the LEDs 3535 emit light at a maintained acute angle of 35° relative to the printed circuit board 351. The light is obliquely transmitted into the light guide plate 355 and exits the light emitting surface 3553. The V protrusions 3534 divert the light to uniformly reach the inner surfaces of the edge of the front wall 311. Thus, a halo effect is generated on the edge of the front wall 311, and optical effect of the liquid crystal display 30 is improved. The angle between light emitted from the LEDs 3535 and the printed circuit board 351 is variable according to the required optical effect.

Unlike conventional liquid crystal displays, the liquid crystal display 30 includes light emitting elements 353 directly fixed on the printed circuit board 351, simplifying assembly, and, further, angled disposition of the LEDs 3535 on the printed circuit board 351 results in obliquely emitted incident light on the light guide plate 355 increasing the illuminated region. The number of LEDs 3535 deployed can thus be reduced and cost of the liquid crystal display 30 be decreased correspondingly. Additionally, the light guide plate 355 enhances uniformity of light transmitted, improving quality of the optical effect thereof.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display comprising:
a frame defining a space;
a liquid crystal panel;
a backlight module; and
a light source assembly, the liquid crystal display, the backlight module and the light source assembly received in the space, the light source assembly comprising:
a light guide plate;
a printed circuit board facing the light guide plate; and
at least two light emitting elements, each comprising a cuneiform base and a light emitting diode placed on the cuneiform base, wherein the cuneiform base is fixed into the printed circuit board, and comprises a first surface, a second surface, a third surface and a bottom surface connected end by end, the bottom surface adjacent to the printed circuit board, and the first surface and the printed circuit board defining an acute angle therebetween, the first surface perpendicularly connected with the second surface, and the third surface perpendicularly connected with the bottom surface, such that the at least two light emitting elements are angled on the printed circuit board and light is obliquely emitted from the at least two light emitting elements onto the light guide plate.

2. The liquid crystal display of claim 1, wherein the light emitting diode is on the second surface of the base.

3. The liquid crystal display of claim 1, wherein each of the at least two light emitting elements further comprises at least two electrodes on the base, the at least two electrodes plugged into and electrically connected with the printed circuit board.

4. A liquid crystal display comprising:
a front frame defining a first space;
a liquid crystal panel;
a backlight module providing backlight for the liquid crystal panel; and
a light source assembly, the liquid crystal display, the backlight module and the light source assembly received in the first space, the light source assembly comprising:
a light guide plate comprising a light incident surface;
a printed circuit board comprising an outer surface, the outer surface facing the light incident surface of the light guide plate; and
at least two light emitting elements, each of the at least two light emitting elements comprising a cuneiform base and a light emitting diode, wherein the base comprises an inclined surface inclined to the outer surface of the printed circuit board, and the light emitting diode is placed on the inclined surface of the base such that the light emitting diode is angled on the printed circuit board, whereby light is obliquely emitted from the at least two light emitting elements onto the light guide plate.

5. The liquid crystal display of claim 4, wherein the front frame comprises a front wall and a window surrounded by the front wall, a display screen of the liquid crystal panel facing the window, the light source assembly attached to an edge of the front wall to provide backlight for the front wall to generate a halo effect on the edge of the front wall.

6. The liquid crystal display of claim 5, wherein the front frame further comprises a plurality of first side walls perpendicularly connected with the front wall, and the light source assembly is located below a side surface of the liquid crystal panel and is received in a second space surrounded by the side surface of the liquid crystal panel, an inner surface of the front wall and one of the first side walls corresponding to the side surface of the liquid crystal panel.

7. The liquid crystal display of claim 4, wherein the printed circuit board comprises a plurality of slots, and each base comprises at least two poles fixed in the slots.

8. The liquid crystal display of claim 4, wherein each of the at least two light emitting elements comprises at least two electrodes plugged into and electrically connected with the printed circuit board.

9. The liquid crystal display of claim 8, wherein the printed circuit board further comprises an inner surface and an outer surface at opposite sides thereof, a plurality of circuits is located on the inner surface, and the at least two electrodes electrically connect the light emitting diode with the plurality of circuits on the printed circuit board.

10. The liquid crystal display of claim 4, wherein the outer surface of the printed circuit board is coated with reflective materials.

11. The liquid crystal display of claim 4, wherein the light incident surface comprising a plurality of V-shaped protrusions.

12. The liquid crystal display of claim 4, wherein the base is cuneiform, and further comprises a first surface, a third surface and a bottom surface, the first surface, the inclined surface, the third surface and the bottom surface are connected end to end, the bottom surface is adjacent to the printed circuit board, and the first surface and the printed circuit board define an acute angle therebetween.

13. The liquid crystal display of claim 12, wherein the acute angle is 35°.

14. The liquid crystal display of claim 12, wherein the first surface is perpendicularly connected with the inclined surface, and the third surface is perpendicularly connected with the bottom surface.

15. A display device comprising:
a front frame defining an opening and comprising an edge portion adjacent to the opening;
a display module attached to the front frame and comprising a display screen facing the opening;
a light source assembly attached to the front frame and fastened in the edge portion of the front frame to provide backlight for the edge portion to generate a halo effect on the edge portion of the front frame, the light source assembly comprising:
a light guide plate comprising a light incident surface and a light emitting surface at opposite sides thereof;
a printed circuit board comprising an outer surface, the outer surface facing the light incident surface of the light guide plate; and
at least two light emitting elements, each of the at least two light emitting elements comprising a cuneiform base and a light emitting diode, wherein the base comprises an inclined surface inclined to the outer surface of the printed circuit board, and the light emitting diode is placed on the inclined surface of the base such that the light emitting diode is angled on the printed circuit board, whereby light is obliquely emitted from the at least two light emitting elements onto the light guide plate.

16. The display device of claim 15, wherein each of the at least two light emitting elements comprises at least two electrodes plugged into and electrically connected with the printed circuit board, the printed circuit board further comprises an inner surface and an outer surface at opposite sides thereof, a plurality of circuits is located on the inner surface, and the at least two electrodes electrically connect the light emitting diode with the plurality of circuits on the printed circuit board.

17. The display device of claim 15, wherein the outer surface of the printed circuit board is coated with reflective materials.

18. The display device of claim 15, wherein the light incident surface comprises a plurality of V-shaped protrusions.

19. The display device of claim 15, wherein the base is cuneiform, and further comprises a first surface, a third surface and a bottom surface, the first surface, the inclined surface, the third surface and the bottom surface are connected end to end, the bottom surface is adjacent to the printed circuit board, and the first surface and the printed circuit board define an acute angle therebetween.

20. The display device of claim 19, wherein the first surface is perpendicularly connected with the inclined surface, and the third surface is perpendicularly connected with the bottom surface.

* * * * *